United States Patent
Giuliano

(10) Patent No.: US 12,308,684 B2
(45) Date of Patent: May 20, 2025

(54) BATTERY MANAGEMENT INFRASTRUCTURE

(71) Applicant: Murata Manufacturing Co., Ltd., Kyoto (JP)

(72) Inventor: David Giuliano, San Diego, CA (US)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 18/551,958

(22) PCT Filed: Mar. 23, 2022

(86) PCT No.: PCT/US2022/021498
§ 371 (c)(1),
(2) Date: Sep. 22, 2023

(87) PCT Pub. No.: WO2022/204251
PCT Pub. Date: Sep. 29, 2022

(65) Prior Publication Data
US 2024/0170994 A1    May 23, 2024

Related U.S. Application Data

(60) Provisional application No. 63/165,519, filed on Mar. 24, 2021.

(51) Int. Cl.
*H02J 7/00* (2006.01)
*H02J 50/10* (2016.01)
(Continued)

(52) U.S. Cl.
CPC .............. *H02J 7/007* (2013.01); *H02J 50/10* (2016.02); *H02M 1/32* (2013.01); *H02M 3/07* (2013.01);
(Continued)

(58) Field of Classification Search
CPC .. H02M 1/32; H02M 3/07; H02J 50/00; H02J 50/10; H02J 7/007; H02J 7/06;
(Continued)

(56) References Cited

U.S. PATENT DOCUMENTS

2015/0311720 A1* 10/2015 Zhao ...................... H02J 7/0068
                                                                                                    307/43
2018/0115157 A1*  4/2018 Chan ...................... H02J 7/342
(Continued)

FOREIGN PATENT DOCUMENTS

WO    WO-2020086507 A1 *  4/2020 ............... H02J 7/00

OTHER PUBLICATIONS

International Search report for PCT/US2022/021498 dated Jun. 27, 2022 (3 pgs).

*Primary Examiner* — Edward Tso
*Assistant Examiner* — Aaron Piggush
(74) *Attorney, Agent, or Firm* — Haynes and Boone, LLP

(57) ABSTRACT

Briefly, example architectures and/or circuit topologies are disclosed herein that may be implemented, in whole or in part, to facilitate and/or support one or more operations and/or techniques for battery management infrastructure, such as for use with one or more power converters, which may include, for example, one or more switched-capacitor power converters.

21 Claims, 17 Drawing Sheets

(51) Int. Cl.
   *H02M 1/32*   (2007.01)
   *H02M 3/07*   (2006.01)
   *H02J 7/06*   (2006.01)
   *H02J 50/00*  (2016.01)

(52) U.S. Cl.
   CPC ............... *H02J 7/06* (2013.01); *H02J 50/00* (2016.02); *H02J 2207/10* (2020.01); *H02J 2207/20* (2020.01); *H02J 2207/30* (2020.01); *H02J 2207/40* (2020.01)

(58) Field of Classification Search
   CPC ............ H02J 2207/10; H02J 2207/20; H02J 2207/30; H02J 2207/40
   USPC ..................... 320/137, 138, 140, 163, 166
   See application file for complete search history.

(56) References Cited

U.S. PATENT DOCUMENTS

| | | | | |
|---|---|---|---|---|
| 2019/0115830 | A1* | 4/2019 | Giuliano | H02M 3/158 |
| 2019/0148795 | A1* | 5/2019 | Hawley | H02M 3/07 |
| | | | | 320/134 |
| 2020/0106290 | A1* | 4/2020 | Ma | H02J 7/00 |
| 2020/0358305 | A1* | 11/2020 | Li | H02J 50/12 |
| 2020/0366120 | A1* | 11/2020 | Yuan | H02J 7/00 |

* cited by examiner

BATTERY MANAGEMENT INFRASTRUCTURE

CROSS-REFERENCE TO RELATED PATENT APPLICATIONS

The present application is the National Phase of PCT International Application No. PCT/US2022/021498, filed Mar. 23, 2022, which claims priority to U.S. Provisional Patent Application Ser. No. 63/165,519, filed Mar. 24, 2021, entitled "Battery Management Infrastructure." The contents of the above-referenced applications are incorporated herein by reference in their entirety.

TECHNICAL FIELD

The present disclosure relates generally to power conversion and, more particularly, to battery management infrastructure for use with power converters, which may include, for example, switched-capacitor power converters.

BACKGROUND

At times, certain electronic devices, such as portable electronic devices (e.g., smartphones, laptops, tablet computers, etc.), for example, may be used while plugged into an alternating current (AC) source. During this time, a battery manager or like device or system may provide power to charge an associated battery, if appropriate, and to operate a portable electronic device itself. In some instances, such as if an AC source is disconnected, a battery manager or like device or system may switch over so that a battery provides power to the electronic device. At times, an increasing demand in a diversity of loads in battery-operated portable electronic devices may reduce battery life. To address these or like challenges, in some instances, higher battery cell counts may be incorporated into such devices. However, this may increase battery charging time once a battery is depleted. Accordingly, how to implement more effective and/or more efficient battery management, for example, to extend battery life, reduce battery charging time, etc., continues to be an area of development.

BRIEF DESCRIPTION OF THE DRAWINGS

Subject matter is described with particularity throughout the specification. However, both as to organization and/or method of operation, together with objects, features, and/or advantages thereof, it may best be understood by reference to the following detailed description if read with the accompanying drawings.

Reference is made in the following detailed description to accompanying drawings, which form a part hereof, wherein like numerals may designate like parts throughout that are corresponding and/or analogous.

DETAILED DESCRIPTION

Some example architectures and/or circuit topologies are disclosed herein that may be used, in whole or in part, to facilitate and/or support one or more operations and/or techniques for battery management infrastructure, such as for use with one or more power converters, which may include, for example, one or more switched-capacitor power converters. As discussed in greater detail below, in one or more particular embodiments, battery management infrastructure may incorporate, for example, one or more charge pumps (CP) and/or hybrid converters, such as to facilitate and/or support power delivery in and/or for battery-operated portable electronic devices. To promote clarity in explaining one or more concepts, reference is sometimes made to one or more specific circuits and/or topologies, such as, for example, specific switched-capacitor circuits and/or specific switched-capacitor circuit topologies. It should be understood, however, that such references are merely provided as examples and should not be construed as limiting.

It should be noted that, throughout the present disclosure, "charge pumps" should be interpreted broadly and refers to a variety of charge pumps, such as a resonant charge pump (e.g., a charge pump with an inductive element, an LC filter, etc.), a non-resonant charge pump, adiabatic, partially adiabatic, diabatic, fully resonant, partially resonant, and so forth, just to name a few examples. Typically, for higher power applications, a resonant charge pump may be employed, for example, and for lower power applications, a non-resonant charge pump may be employed.

Figure 1:
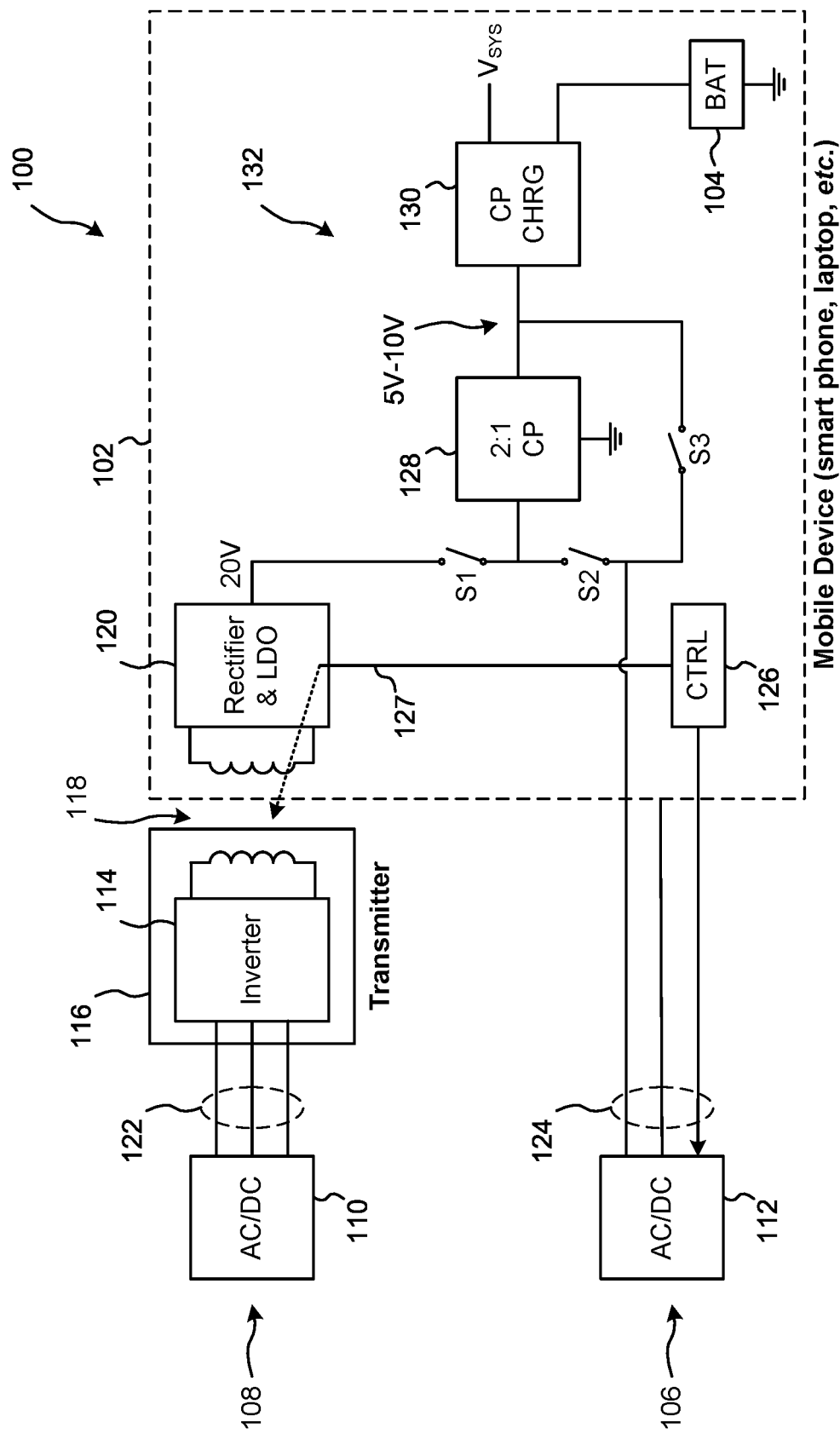
FIG. 1 is a schematic diagram illustrating an implementation of example battery management infrastructure.

FIG. 1 a schematic diagram illustrating an implementation of an example battery management infrastructure 100. In an implementation, battery management infrastructure 100 may include, for example, a portable electronic device, illustrated as a mobile device 102 (e.g., a smartphone, laptop, tablet computer, etc.). Mobile device 102 may, for example, be capable of receiving power (such as to facilitate and/or support charging a battery or a battery stack 104) via a wired power delivery path (e.g., USB-C, etc.), referenced generally via an arrow at 106. Note that the terms "battery" and "battery stack" may be used interchangeably herein. Mobile device 102 also may, for example, be capable of receiving power (such as to facilitate and/or support charging battery 104) via a wireless power delivery path (e.g., Qi, etc.), referenced generally via an arrow at 108. It should be noted that a particular power delivery path may depend, at least in part, on mobile device capabilities, among other aspects. For example, a smartphone may be capable of receiving power via a wired as well as a wireless power delivery path, and a laptop computer may be capable of receiving power via a wired power delivery path. It should also be noted that, in some instances, mobile device 102 may, for example, be capable of providing power, such as if a load is coupled to a suitable USB cable, such as USB cable 122 and/or 124 discussed below.

As also illustrated, to facilitate and/or support power delivery, one or more adapters, such as AC/DC adapters 110 and 112 may be employed. In at least one implementation, AC/DC adapters 110 and/or 112 may comprise, for example, Type-C USB travel adapters that may attach to a wall outlet that supplies an AC voltage. In some instances, with respect to wireless power delivery path 108, AC/DC adapter 110 may provide a DC voltage to an inverter 114 (e.g., to generate a higher frequency AC), which may be part of a wireless transmitter 116, such as via a USB cable 122. As also illustrated, wireless transmitter 116 and/or inverter 114 may include a first coil that may be brought in proximity with a second coil within mobile device 102 so as to form an air-core transformer, referenced generally at 118. Air-core transformer 118 may, for example, permit energy provided by the first coil to be made available at the second coil so that such energy can be used to charge an applicable battery (e.g., battery 104, etc.), as will be discussed in greater detail below. A voltage provided via air-core transformer 118 may be rectified using one or more applicable techniques, such as via a suitable circuit that, in a particular implementation, may comprise, for example, a bridge rectifier and a low drop-out regulator (LDO) 120, and such rectified voltage may be subsequently provided within mobile device 102 (e.g., as a 20-30 VDC, etc.).

In an implementation, with respect to wired power delivery path 106, AC/DC adapter 112 may, for example, provide power to mobile device 102, such as directly via a suitable USB cable 124. Depending on an implementation, power provided to mobile device 102 via wired power delivery path 106 may be in a range between 5 and 50 volts, which in turn may depend, at least in part, on a particular mobile device 102, its utilization, or the like. Although not shown, battery management infrastructure 100 and/or mobile device 102 may further include one or more suitable controllers, such as to facilitate and/or support one or more battery management-related operations and/or techniques. For example, at times, such one or more controllers may provide one or more control signals to a suitable control circuit CTRL 126. In an implementation, CTRL 126 may be capable of communicating with AC/DC adapter 112 and/or 110, which may involve transmitting one or more suitable commands (e.g., digital information, etc.) via USB cable 124 and/or an air gap of air-core transformer 118 (as illustrated via a link 127 and USB cable 122). Such one or more commands may, for example, instruct AC/DC adapter 112 and/or 110 to provide a regulated input voltage and/or current in order to charge battery 104, or to adjust the AC voltage output of the inverter 114. This may, for example, be useful in implementations in which a mobile device 102 may not have a voltage regulating capability (e.g., may comprise charge pumps, may have no requisite switches, etc.), but may rely on an applicable AC/DC adapter to supply a battery with a desired voltage, such as via a suitable control circuitry (e.g., CTRL 126, etc.).

In an implementation, a regulated power may be alternately provided to battery 104 via wired power delivery path 106, such as by closing a switch S2 and opening a switch S1, or via wireless power delivery path 108, such as by closing switch S1 and opening switch S2. CTRL 126 and/or other suitable circuitry in mobile device 102 may determine which power delivery path to use in order to supply a regulated power to battery 104, such as by closing and/or opening switches S1 and S2. In some instances, a bypass switch S3 may be used, at least in part, to facilitate and/or support fixed input voltages (e.g., 5V, etc.) from legacy AC/DC converters. As illustrated, in some instances, bypass switch S3 may allow regulated power to skip a charge pump (CP) stage 128 (e.g., 2:1, etc.) by closing switch S3 and opening switch S2. As also seen, an output of charge pump stage 128 may comprise an input to a charging circuit 130 having one or more charge pumps (e.g., CP/3L), which charges battery 104 and/or provides a system voltage $V_{SYS}$. As will also be seen, one or more suitable power architectures for a charging circuit, referenced generally at 132, that incorporate one or more charge pumps may be implemented within battery management infrastructure 100, in whole or in part, such as to facilitate and/or support charging battery 104.

Figure 2:
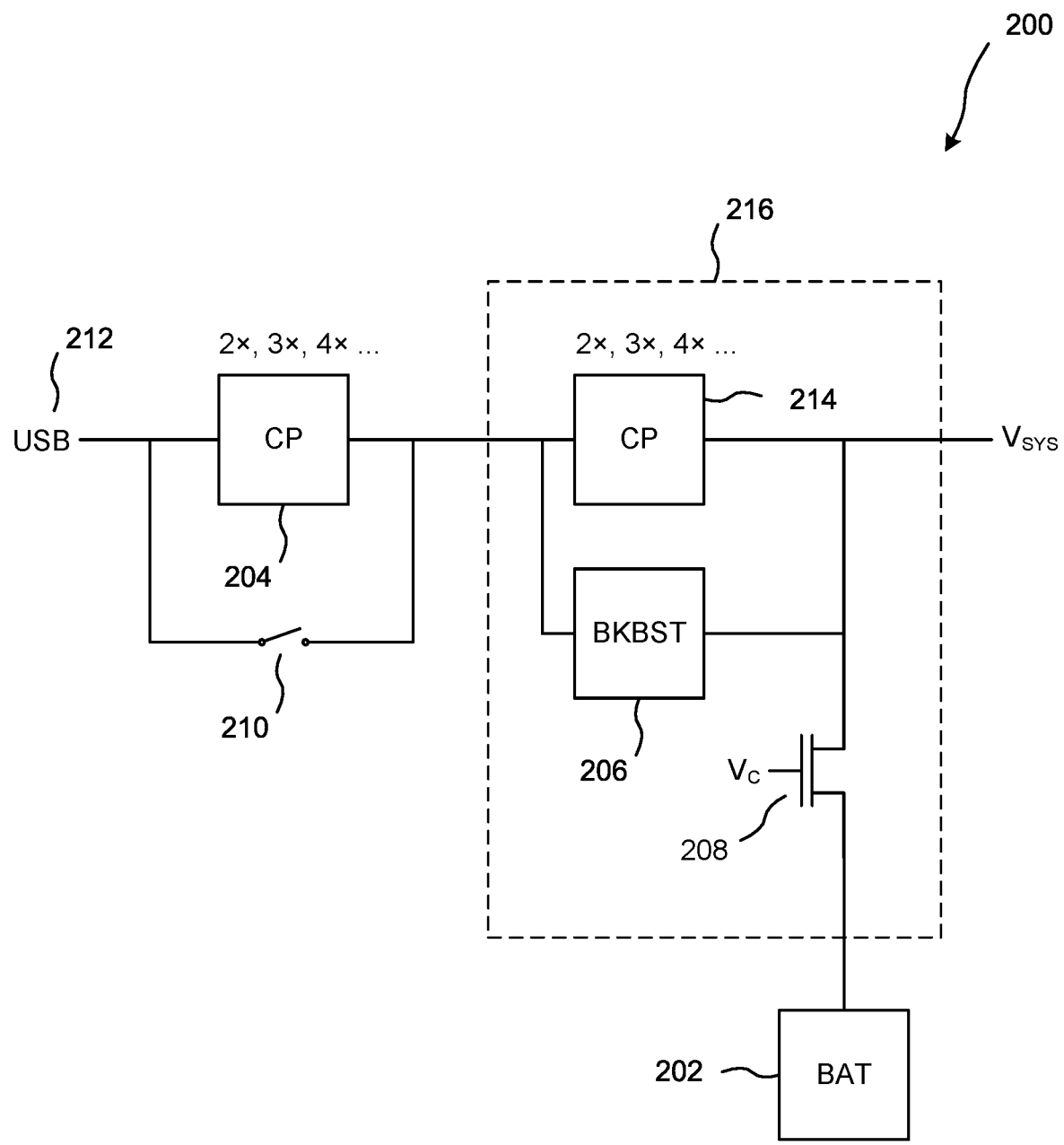
FIGS. 2 and 3 are schematic diagrams illustrating implementations of example charging circuits with one or more respective charge pumps.
Figure 3:
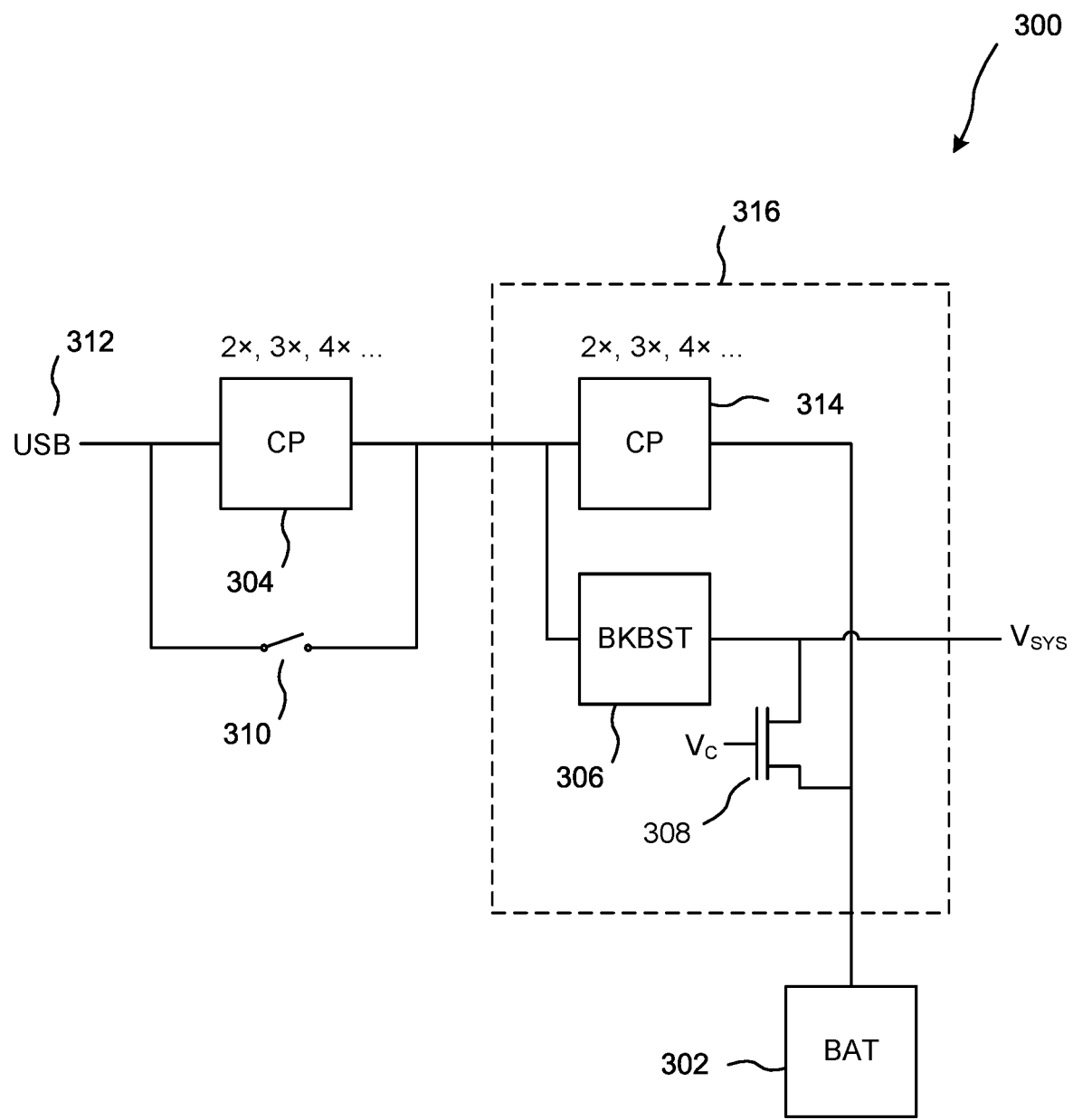

FIGS. 2 and 3 are schematic diagrams illustrating implementations of example charging circuits with one or more respective charge pumps (CP/CHRG circuits) 200, 300. In some instances, CP/CHRG circuits 200, 300 may, for example, be implemented, in whole or in part, instead of or in addition to charging circuit 132 of FIG. 1. CP/CHRG circuits 200, 300 may facilitate and/or support charging respective batteries 202, 302, for example, and may provide a system voltage $V_{SYS}$ so as to power one or more appropriate loads.

As illustrated, depending on an implementation, a conversion ratio of an initial CP 204, 304 may be fixed (e.g., 2×, 3×, 4×, etc.) or may be reconfigurable. In some implementations, respective CP/CHRG circuits 200, 300 may include, for example, an additional CP (e.g., fixed conversion ratio or reconfigurable) 214, 314, a buck-boost (BKBST) converter 206, 306, and a charging transistor 208, 308, such as a constant current-constant voltage (CC-CV) charging transistor controlled by a control signal $V_C$. CC-CV charging transistors 208 and 308 may, for example, be coupled in series with respective batteries (e.g., 202 and 302) so as to regulate and/or control battery charging. Particular examples of CC-CV charging transistors or simply CC-CV chargers will be discussed in greater detail below. In certain implementations, CPs 214 and/or 314 and/or BKBST converters 206 and/or 306 may incorporate gallium nitride (GaN) or any other suitable compound semiconductor switches, as also discussed below.

Respective CP/CHRG circuits 200, 300 may further include, for example, a respective bypass switch 210, 310. Such a bypass switch 210, 310 may, for example, be used to bypass an associated CP (e.g., CP 204, CP 304, etc.), if suitable or desired. By way of example but not limitation, if a voltage provided via a USB source is non-programmable (e.g., fixed, etc.) and/or relatively low (e.g., about 5 volts, etc.), then a CP (e.g., initial CPs 204, 304, etc.) may be bypassed, such as via closing an applicable bypass switch (e.g., switches 210, 310, etc.) since the CP may not be able to provide more precise or otherwise suitable voltage to an applicable battery (e.g., 202, 302, etc.). Typically, although not necessarily, CPs may be useful with relatively higher voltages, programmable voltage supply, etc.

Since a BKBST converter 206, 306 may be capable of receiving relatively wide input ranges and providing relatively wide output ranges for a battery, the BKBST converter 206, 306 may be used, at least in part, to support one or more legacy-type applications. For example, as indicate above, if a voltage supplied via a USB source is non-programmable (e.g., fixed, etc.) and/or relatively low (e.g., may need boosting), then an initial CP (e.g., 204, 304, etc.) may be bypassed and routed to an applicable BKBST converter (e.g., 206, 306, etc.). With respect to a BKBST converter, a buck aspect or feature may be used to decrease a USB-provided voltage, for example, and a boost aspect or feature may be used to increase a USB-provided voltage, such as using one or more appropriate techniques to facilitate and/or support appropriate battery charging.

Figure 4:
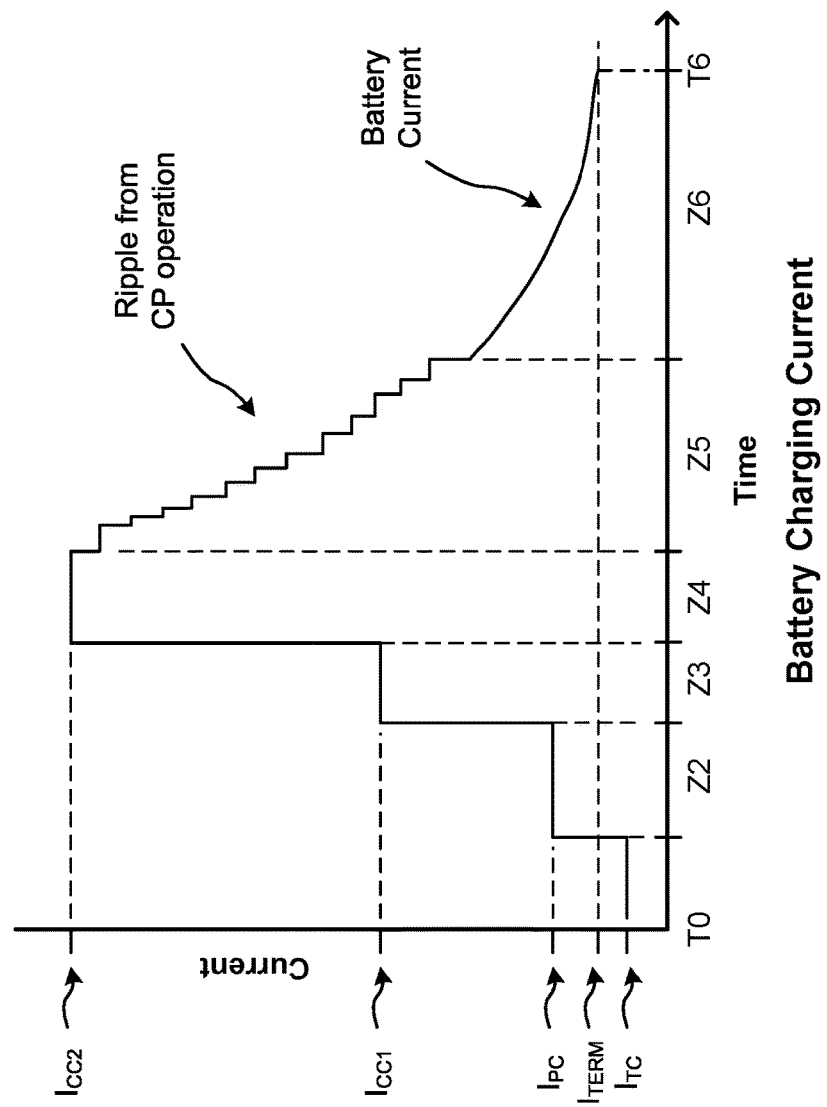
FIGS. 4 and 5 illustrate battery charging current and battery charging voltage graphs, respectively.
Figure 5:
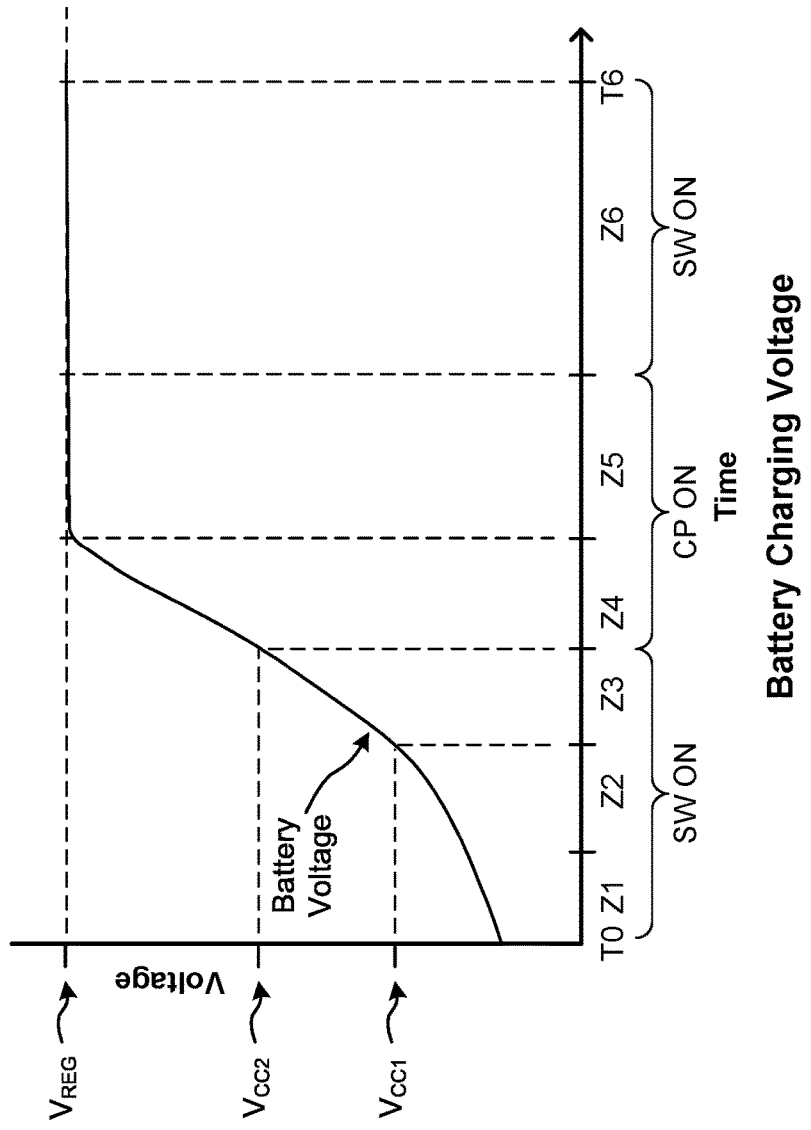

According to certain implementations, battery 202, 302 may be charged via a number of phases, such as preconditioning, constant current, and constant voltage. In some instances, these phases may, for example, be further subdivided into a number of sub-phases or zones. As a way of illustration, these sub-phases or zones may include, for example, a trickle charge phase, a pre-charge phase, a constant current (CC) phase, and a constant voltage (CV) or taper phase. In these or like charging phases, a charger may monitor one or more applicable temperatures, for example, and may reduce a charge current, such as if a particular monitored temperature meets or exceeds its threshold. By way of example but not limitation, FIGS. 4 and 5 illustrate battery charging current and battery charging voltage graphs, respectively. Referring also to an accompany table 402, 502, in a trickle charge phase, a battery is charged with a trickle current $I_{TC}$, and in a pre-charge phase, the battery is charged with a pre-charge current $I_{PC}$. Once a battery voltage crosses a $V_{CC1}$ threshold, a battery is charged with a first fast charging constant current $I_{CC1}$, for example, and switches to a second fast charging constant current $I_{CC2}$ if a battery voltage crosses a $V_{CC2}$ threshold. As a battery voltage reaches $V_{REG}$, the battery is held at a constant voltage of $V_{REG}$ and the charge current tapers off as the battery approaches full charge. The point at which there is a switch-over from a charge pump (CP) operation to a switcher (SW) operation in the taper or constant voltage phase may be decided by various trigger points, such as, for example, time, voltage, current, or the like. If a battery current reaches $I_{TERM}$, charging is complete.

Referring back to FIGS. 2 and 3, a system bus $V_{SYS}$ may be separated from a battery 202, 302 by a charging transistor, such as a CC-CV charging transistor 208, 308, that may control charging of the battery 202, 302, in whole or in part. Even if a battery 202, 302 is depleted, $V_{SYS}$ may be regulated above a minimum or otherwise suitable system voltage level, for example, otherwise one or more downstream loads may not be able to operate sufficiently. In some instances, there may be a requirement for a particular system to be able to operate without a battery present.

In some instances, such as if a battery 202, 302 is below a certain system voltage level (e.g., below a minimum voltage level), for example, a corresponding CC-CV charging transistor 208, 308 may operate in linear or LDO mode and, thus, may absorb the voltage difference between $V_{SYS}$ and the battery voltage $V_{BAT}$. In other instances, such as if a battery voltage $V_{BAT}$ rises above a certain system voltage level (e.g., above a minimum voltage level, etc.) during charging, for example, a corresponding CC-CV charging transistor 208, 308 may gradually turn ON until it is fully ON with a minimum $V_DS$ of the CC-CV charging transistor. In some instances, a CC-CV charging transistor 208, 308 may also be OFF in one or more "sleep" states to reduce a current draw on battery. Also, a CC-CV charging transistor 208, 308 may be capable of at least partially controlling a charging current in one or more preconditioning stages (e.g., $I_{TC}$ & $I_{PC}$).

In an implementation, to further reduce this voltage drop, an optional low ON resistance (low $R_{ON}$) switch may be placed in parallel with a CC-CV charging transistor (e.g., since the CC-CV charging transistor may act as a parasitic element). Thus, in some implementations, another switch (e.g., a lower resistance switch, etc.) may be placed in parallel with a CC-CV charging transistor and may be turned ON to mitigate unwanted parasitic effects. A variety of materials may be incorporated in a CC-CV charging transistor or like switches, such as, for example, GaN, silicon carbide (SiC), or any other suitable compounds.

Thus, in an implementation, it may be useful to couple a charging transistor, such as a CC-CV charging transistor 208, 308, between $V_{SYS}$ and a battery (e.g., 202, 302, etc.) to allow for a voltage drop across $V_{SYS}$ and the battery when the battery is fully discharged. In an embodiment of FIG. 2, the CP 214 of a charging circuit 216 may be coupled to $V_{SYS}$, such as to provide power from CP 214 directly to $V_{SYS}$. This may, for example, be useful if $V_{SYS}$ is coupled to one or more systems that draw or require a significant amount of power (e.g., more than battery 202 can supply). In an embodiment of FIG. 3, the CP 314 of a charging circuit 316 may be directly coupled to battery 302, for example, such as if battery 302 draws a significant amount of power (e.g., more power than $V_{SYS}$). As a way of illustration, if a battery has a very high charging capability, like in a cell phone, then it may be useful to implement an embodiment of FIG. 3. In turn, if $V_{SYS}$ is large, such as if $V_{SYS}$ powers a larger microprocessor (e.g., in a laptop) and battery charging speed is of a lesser importance, then it may be useful to implement an embodiment of FIG. 2.

Figure 6:
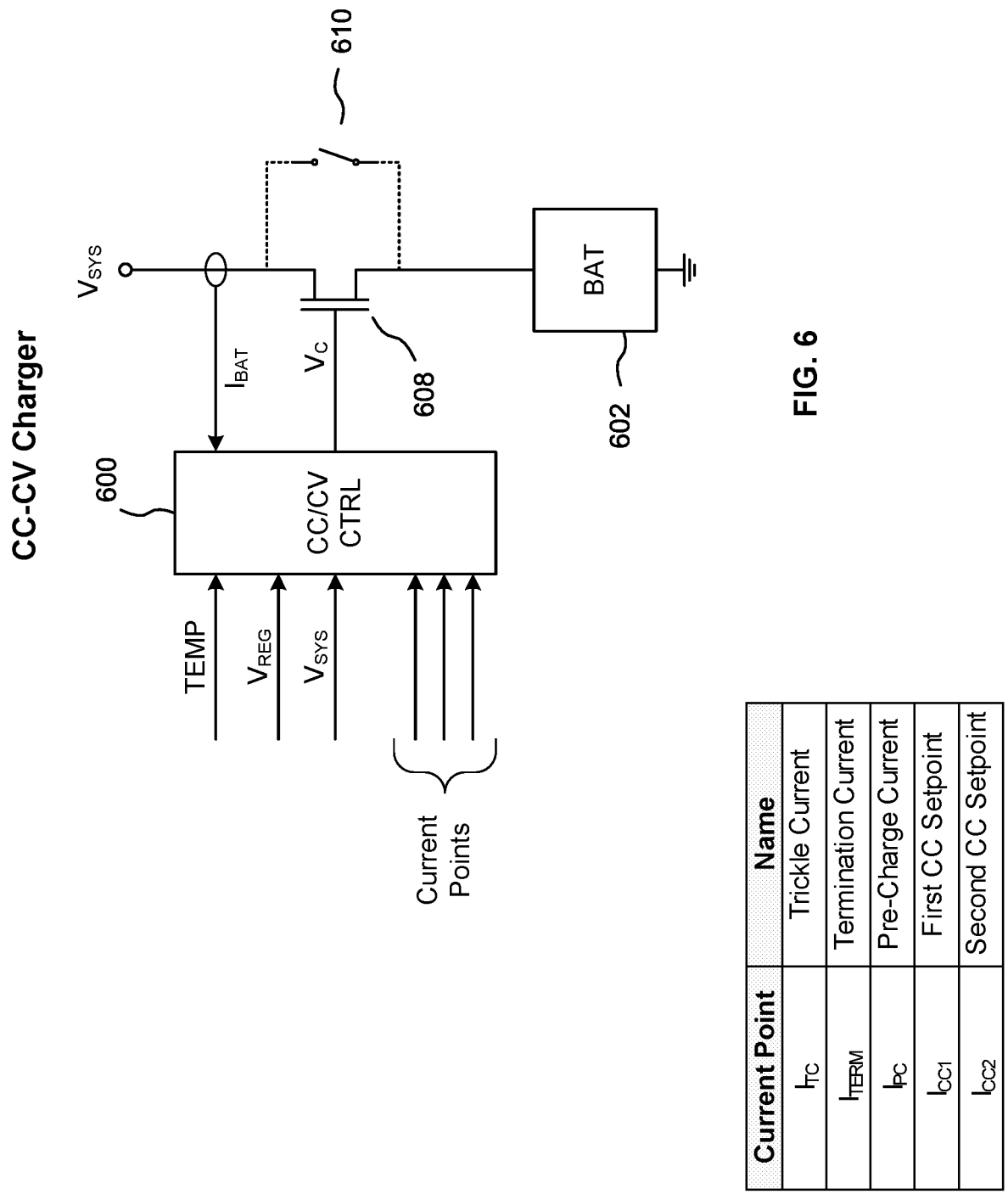
FIG. 6 illustrates an implementation of a CC-CV charging transistor or charger.

By way of example but not limitation, a particular implementation of a CC-CV charging transistor or charger is illustrated in FIG. 6. As seen here, a controller 600 for a battery 602 (which may include multiple cells) may, for example, obtain one or more measurements (e.g., temperature (TEMP), battery current $I_{BAT}$, $V_{REG}$, $V_{sys}$, one or more current points, voltage points, etc.), such as to facilitate and/or support one or more battery charging operations and/or techniques. For example, based, at least in part, on processing the obtained measurements (e.g., matching current, voltage, etc.), the controller 600 may apply an appropriate control voltage $V_C$ to a CC-CV charging transistor or charger 608, such as to manage one or more applicable and/or appropriate phases, such as those discussed above. FIG. 6 also shows an example of a low $R_{ON}$ bypass switch 610 placed in parallel with the CC-CV charging transistor or charger 608, as described above.

Figure 7A:
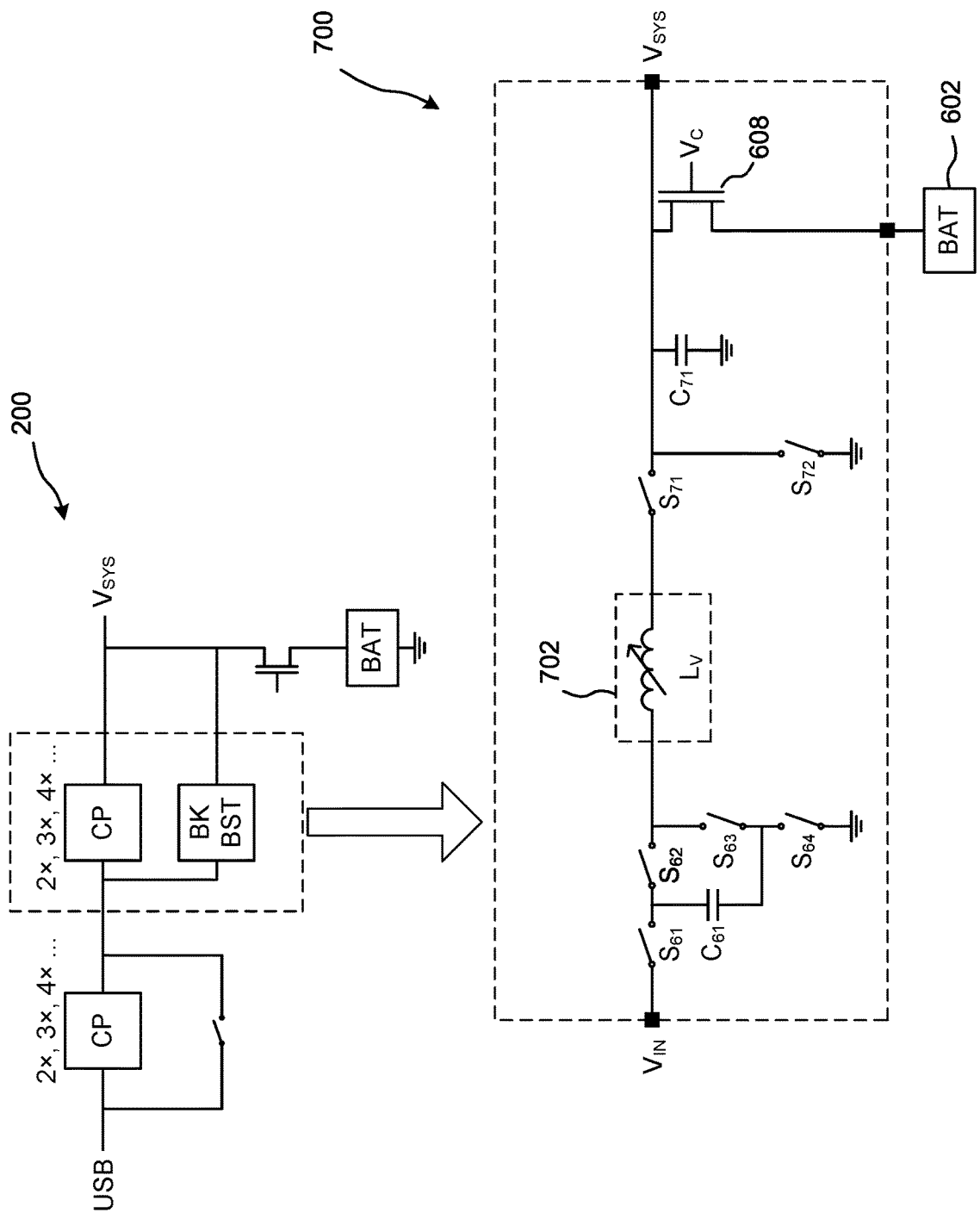
FIG. 7A illustrates an implementation of a merged CP and BKBST converter topology.

As illustrated in FIG. 7A, in an implementation, part of the CP/CHRG circuit 200 from FIG. 2 comprising CP 214 and BKBST converter 206 may be merged into a circuit 700. For example, a boost mode may be achieved by closing switches S61, S62 and opening switches S63, S64. A buck mode may be achieved, for example, by closing switches S71 and opening switch S72. Capacitor C71 provides output smoothing and charge storage.

In some instances, the $V_{SYS}$ output voltage may be regulated by modulating the voltage at the input of an inductor 702, shown in FIG. 7A as an adjustable inductance $L_V$. This may require a higher inductance value and/or higher switching frequency. At times, such as if voltage regulation is not required or otherwise useful, then a voltage at the input of the inductor 702 may not be modulated and this may require a lower inductance and/or lower switching frequency.

Figure 7B:
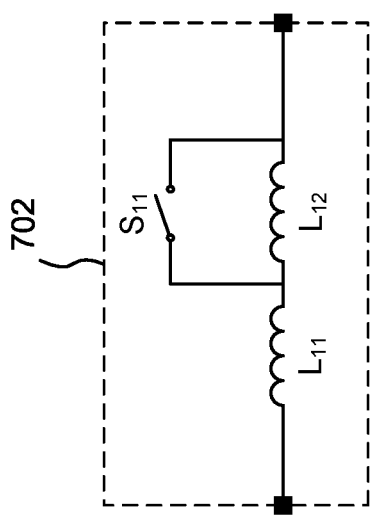
FIG. 7B shows a first embodiment of an adjustable version of the inductor of FIG. 7A.
Figure 7C:
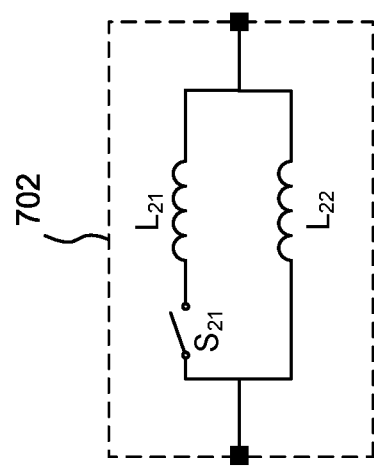
FIG. 7C shows a second embodiment of an adjustable version of the inductor of FIG. 7A.

In some instances, an adjustable inductance $L_V$ may be achieved by opening and closing a switch, which adds or subtracts one or more additional inductors. For example, FIG. 7B shows a first embodiment of an adjustable version of the inductor 702 of FIG. 7A. Opening switch S11 causes the inductance to be the series sum of inductors L11 and L12, while closing switch S11 causes the inductance to be just L11. As another example, FIG. 7C shows a second embodiment of an adjustable version of the inductor 702 of FIG. 7A. Opening switch S21 causes the inductance to be just L22, while closing switch S21 causes the inductance to be L21 in parallel with L22.

In some instances, an adjustable inductor $L_V$ may be achieved, for example, via changing the inductance of the inductor by forcing current into the inductor. For example, the adjustable inductor $L_V$ may comprise three terminals, two being the standard terminals. The third terminal may be where a bias current is forced into the inductor, which may saturate parts of the inductor core which then may lower its inductance. As such, in some instances, no switches may be needed or otherwise useful, such as to regulate an output voltage.

According to an implementation, in a buck mode, there may be two modes of operation—a regulating buck mode or a non-regulating buck mode. A non-regulating mode may involve operating a charge pump (CP) and a regulating mode may involve operating a buck converter. For example, in a non-regulating mode, such as in a 2× charge pump, S61 and S63 may be closed (turned ON) with S62 and S64 open, and that may charge a capacitor C61 of the CP, and the output cycle may be when S64 and S62 are closed (turned ON) with S61 and S63 open, and so forth. Alternating these states may produce a 2× voltage divider. However, to regulate, a third state may be added. For example, a ground state may be added to the input of inductor 702 by turning ON S63 and S64, or a $V_{IN}$ state may be added in which S61 and S62 may be turned ON to couple $V_{IN}$ to the inductor 702. Thus, an output voltage $V_{SYS}$ may be regulated by modulating between $V_{IN}/2$ and ground or $V_{IN}/2$ and $V_{IN}$ at the input of the inductor 702, depending on the duty cycle.

By way of example but not limitation, an example operation of a merged CP and BKBST converter is illustrated in TABLE 1 below. It should be noted that, in some instances, dead time states may be added between States A-E.

TABLE 1

| State | S61 | S62 | S63 | S64 | S71 | S72 |
|---|---|---|---|---|---|---|
| A | ON | ON | OFF | OFF | ON | OFF |
| B | ON | ON | OFF | OFF | OFF | ON |
| C | ON | OFF | ON | OFF | ON | OFF |
| D | OFF | ON | OFF | ON | ON | OFF |
| E | OFF | OFF | ON | ON | ON | OFF |

TABLE 2 below shows different modes achievable by cycling among the States shown in TABLE 1.

TABLE 2

| Mode | State Sequence |
|---|---|
| Boost | A, B, A, B, . . . |
| CP | C, D, C, D, . . . |
| Buck1 ($V_{SYS} < V_{IN}/2$) | C, E, D, E, . . . |
| Buck2 ($V_{SYS} > V_{IN}/2$) | C, A, D, A, . . . |

It should also be noted that, although not shown in FIG. 7A, a suitable controller may, for example, be used, at least in part, to facilitate and/or support operation of a merged CP and BKBST converter. For example, a controller may comprise level shifter circuitry, gate driver circuitry, control circuitry (e.g., to turn applicable switches ON and OFF, etc.), or the like.

Figure 8:
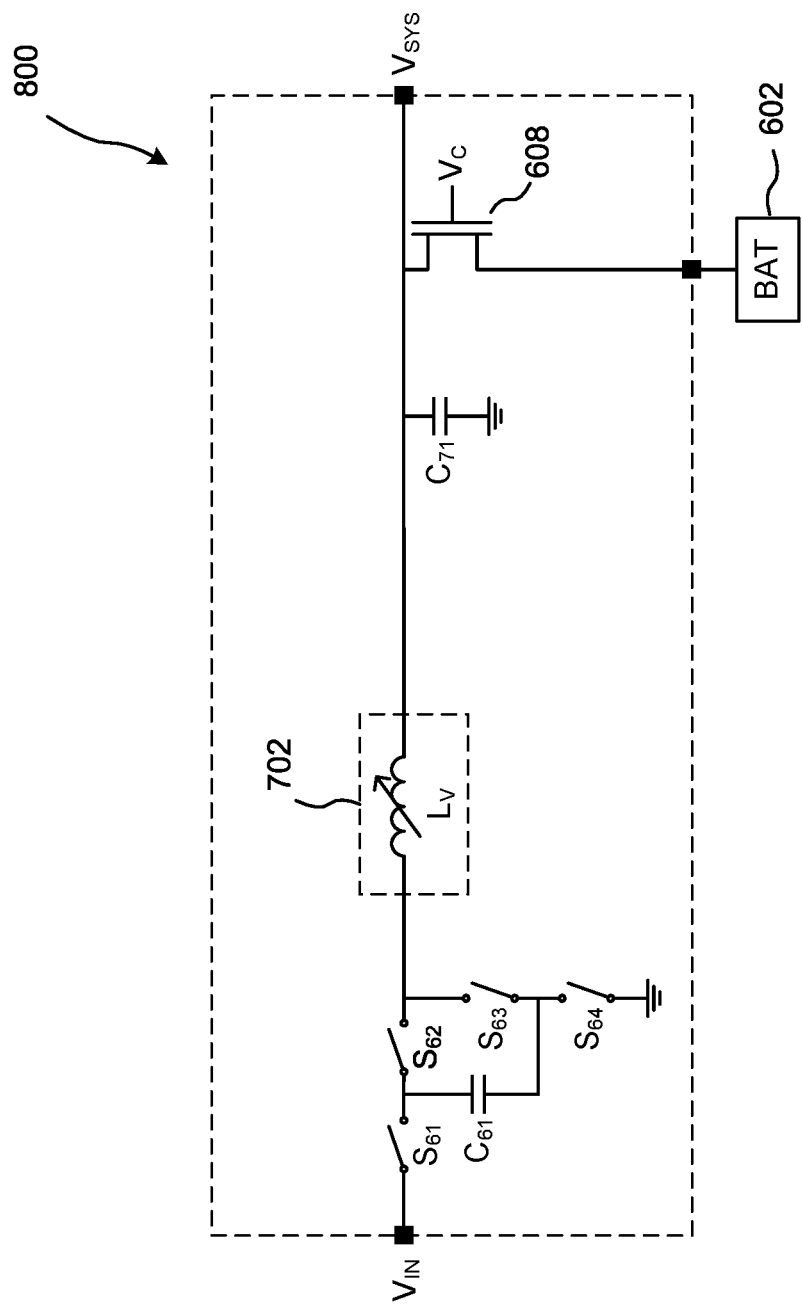
FIG. 8 illustrates an implementation of an example merged buck converter topology.

FIG. 8 illustrates an implementation of an example merged buck converter topology 800 in which a CP and a buck-boost converter are merged into a buck-only design by removing switches S71 and S72 from the merged topology of FIG. 7. This implementation may have improved efficiency of a buck-boost due, at least in part, to removing one series switch (S71).

Figure 9:
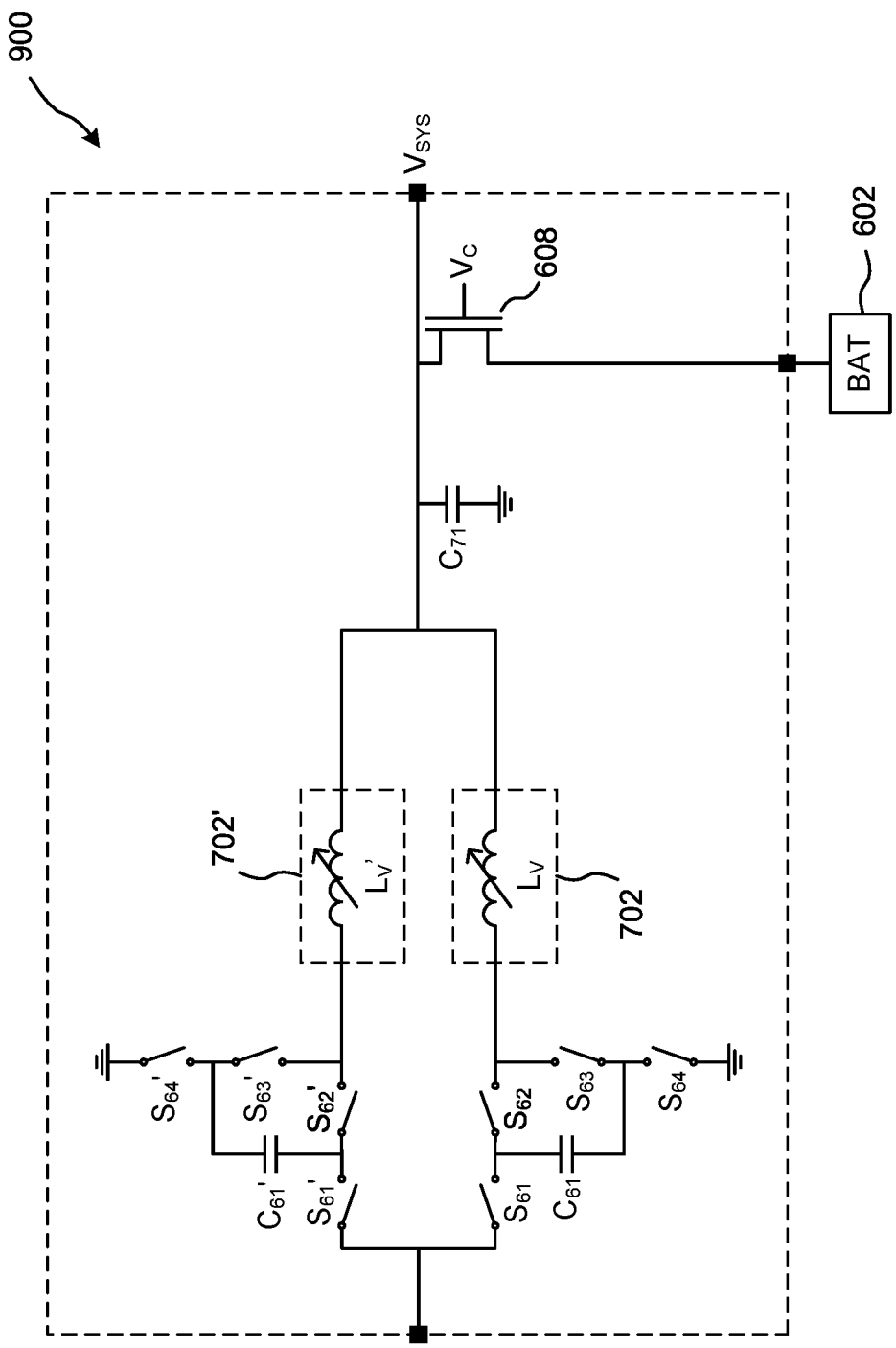
FIG. 9 illustrates an implementation of an example 2-phase merged buck converter topology.

FIG. 9 illustrates an implementation of an example 2-phase merged buck converter topology 900 in which two instances (indicated by non-primed and primed reference labels) of a CP and buck converter (see, e.g., FIG. 8) are merged into a 2-phase buck-only design. A 2-phase design may be useful if there is a significant increase or jump in the input voltage. In some instances, a 2-phase design may also reduce the noise of the input voltage. A 2-phase design may operate in a similar manner, such as discussed above (e.g., operate as a CP, buck, multilevel) and may also include a charging transistor 608, such as a CC-CV charging transistor controlled by a $V_C$ control signal. The $V_C$ control signal may be provided via an applicable control circuitry, as also discussed above, that may communicate with a suitable controller (see, e.g., FIG. 6) to facilitate and/or support proper charging a battery 602 (e.g., by sensing the current into the battery, measuring state of charge, etc.).

Figure 10:
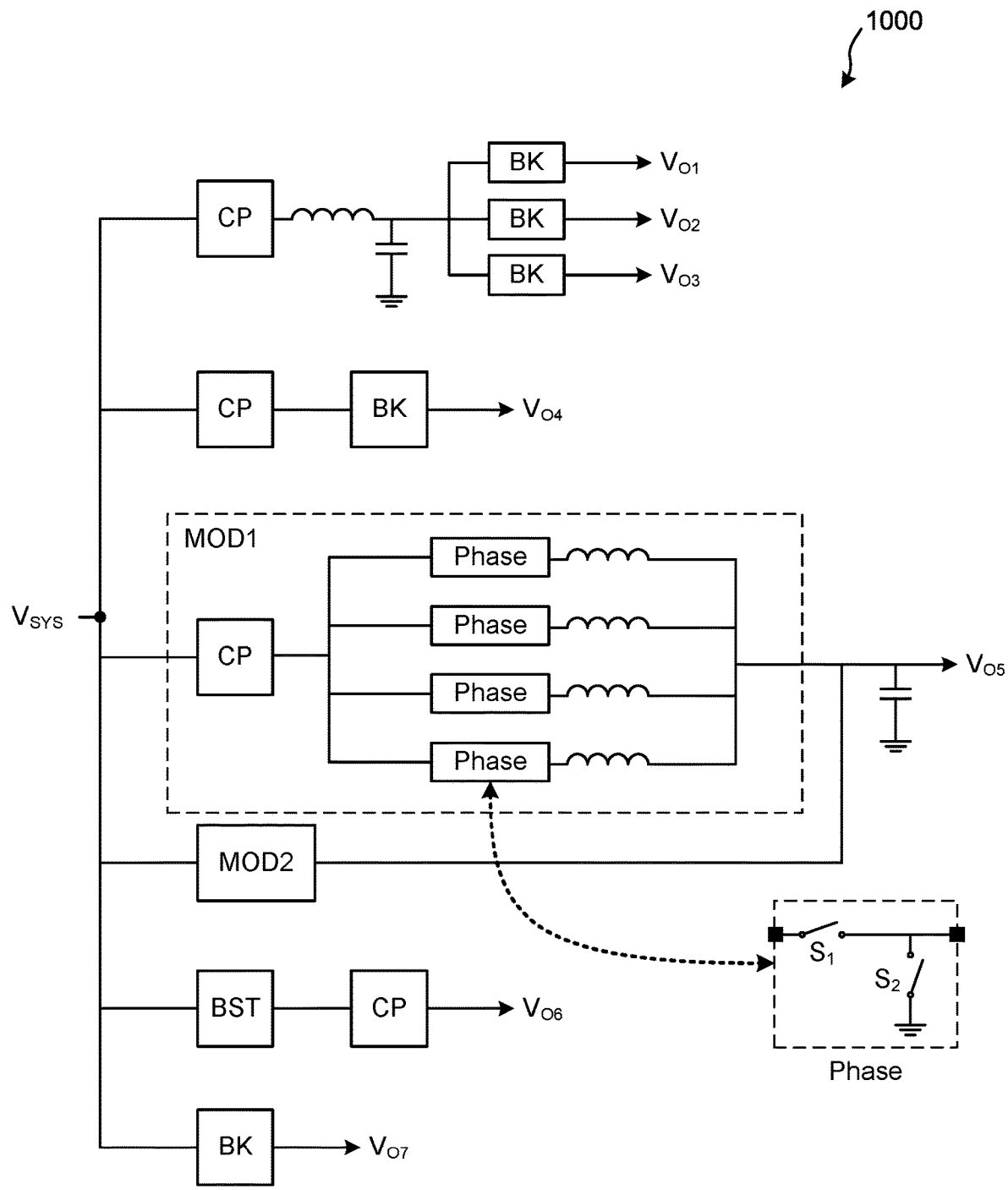
FIG. 10 is a schematic diagram illustrating an implementation of an example system bus converter.

FIG. 10 is a schematic diagram illustrating an implementation of an example system bus converter 1000. Here, a suitable charging circuit with a CP may generate $V_{SYS}$, such as discussed and illustrated with reference to one or more above embodiments. In some instances, $V_{SYS}$ may be used, at least in part, as an input to various power converters in order to provide different power converter outputs. Thus, as illustrated, examples of power converter combinations may include those shown in TABLE 3:

TABLE 3

| Power Converter Combination | Output |
|---|---|
| CP + LC Filter + multi-output bucks | V01-V03 |
| CP + Buck (BK) | V04 |
| Module 1 (CP + multi-phase buck) alone | V05 |
| Module 2 (CP + multi-phase buck) in parallel with Module 1 | V05 |
| Boost (BST) + CP | V06 |
| BK | V07 |

In an implementation, Module 2 may be the same as or similar to Module 1, but may have switching frequencies phase shifted, which may enable higher output currents, for example.

Figure 11A:
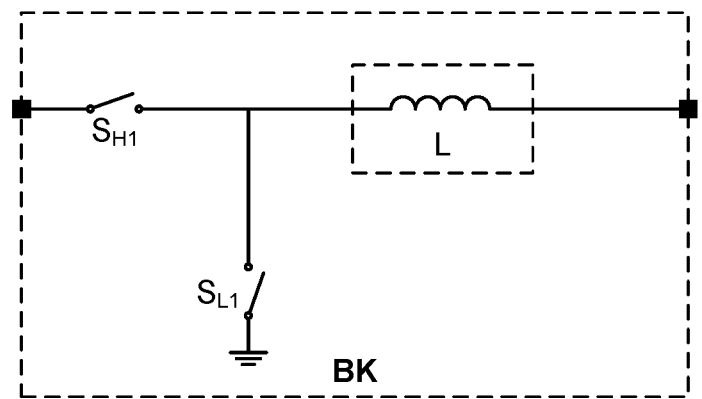
FIGS. 11A-C through 14 illustrate example implementations of various circuit topologies.
Figure 11B:
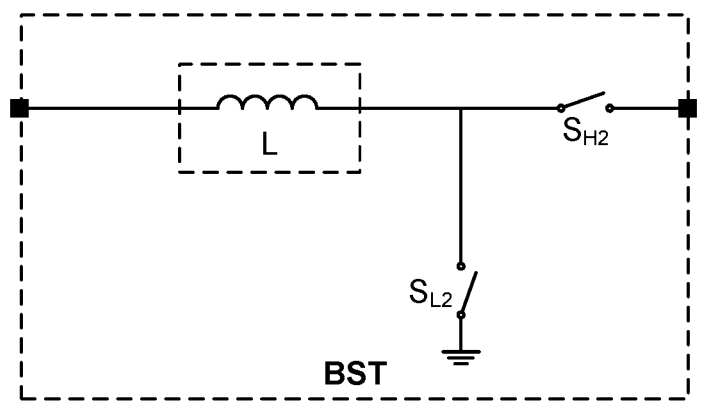
Figure 11C:
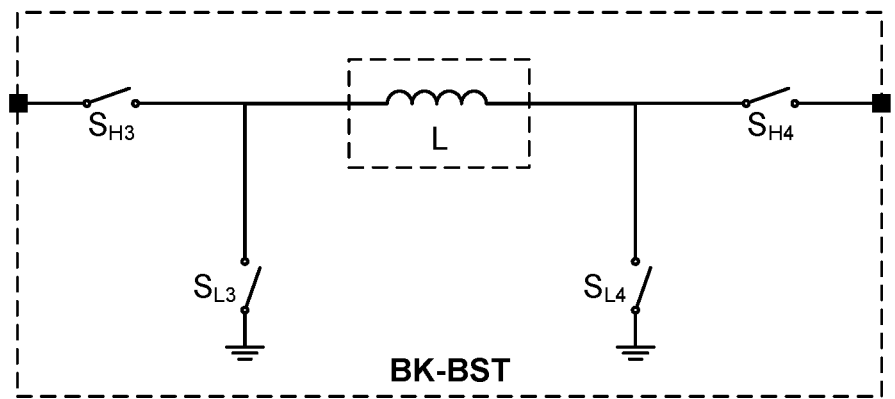

FIGS. 11A-C through 14 illustrate example implementations of various converter circuit topologies. FIG. 11A shows a buck (BK) topology comprising, in this example, an inductance L, an input-side series switch $S_{H1}$, and an input-side shunt switch $S_{L1}$. FIG. 11B shows a boost (BST) topology comprising, in this example, an inductance L, an output-side series switch $S_{H2}$, and an output-side shunt switch $S_{L2}$. FIG. 11C shows a buck-boost (BK-BST) topology comprising, in this example, an inductance L, an input-side series switch $S_{H3}$, an input-side shunt switch $S_{L3}$, an output-side series switch $S_{H4}$, and an output-side shunt switch $S_{L4}$. As should be clear from the other examples of this disclosure, a variable inductance $L_V$ may be used for the inductance L in FIGS. 11A-C.

Figure 12:
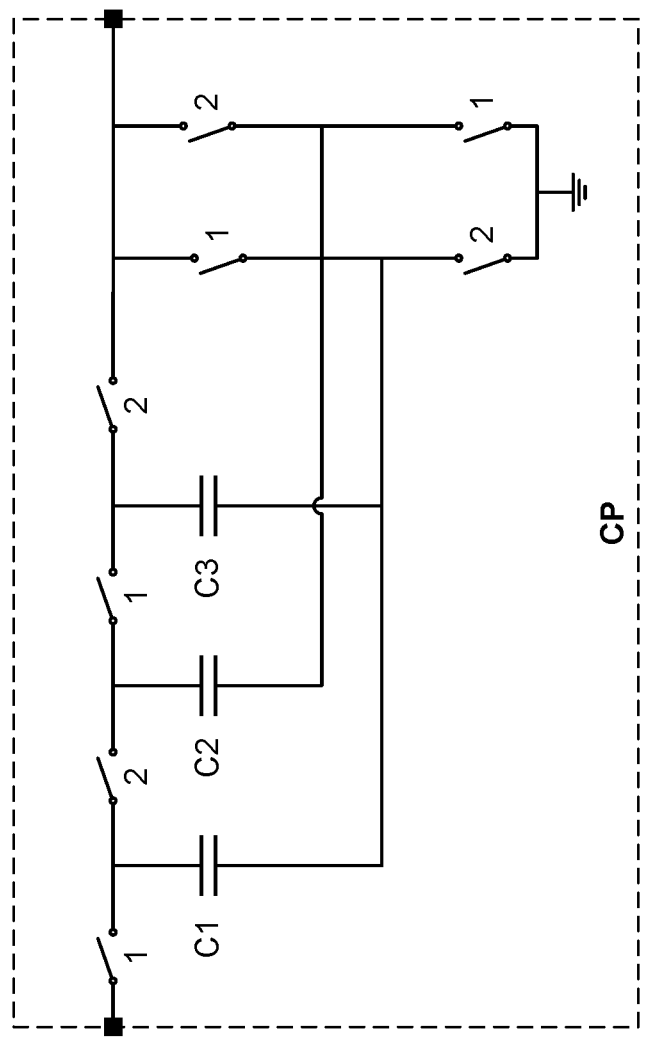

FIG. 12 shows an example of a charge pump (CP) topology that includes three capacitors C1, C2, C3 and associated sets of series switches and shunt switches marked by respective timing phases (1 or 2).

Figure 13:
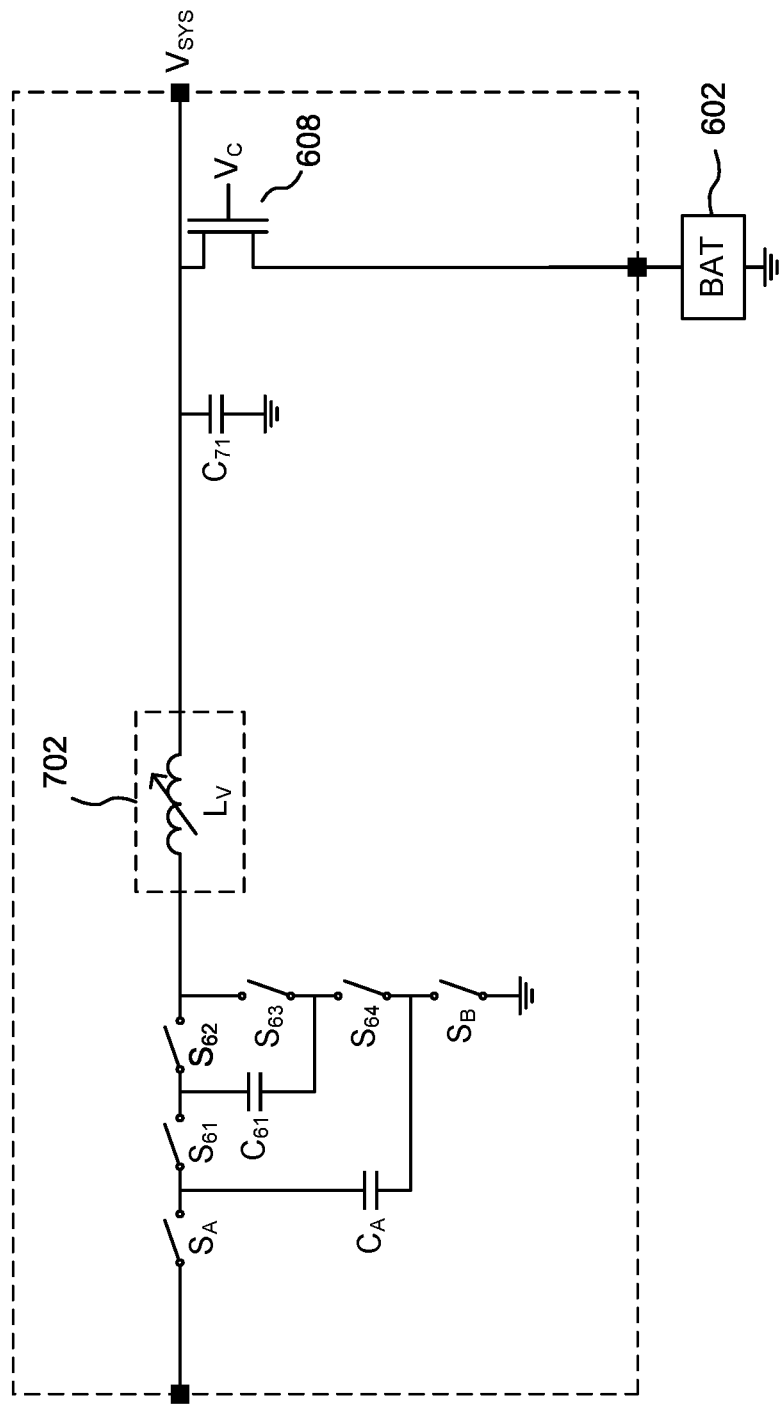

FIG. 13 shows a buck-only charger similar to the circuit of FIG. 8, but including an additional capacitor CA, series switch SA, and shunt switch $S_B$. The operational states would be similar to the states set forth in TABLE 1 above.

Figure 14:
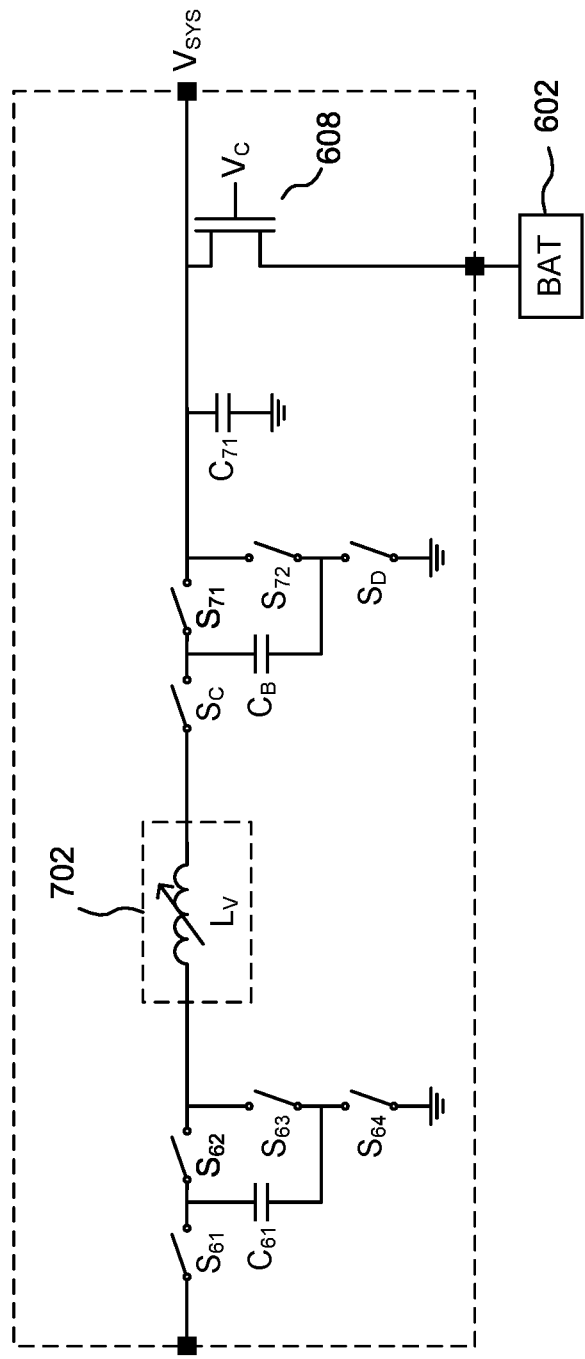

FIG. 14 shows a buck-boost charger similar to the circuit of FIG. 7A, but including an additional capacitor $C_B$, series switch Sc, and shunt switch $S_D$ after the inductor 702. This topology may facilitate and/or support operating the buck-boost charger as a CP or as a multilevel buck-boost. Again, the operational states would be similar to the states set forth in TABLE 1 above.

Depending on an implementation, the circuit topologies shown by way of example in FIGS. 11A-C through 14 may, for example, be used, in whole or in part, to facilitate and/or support one or more battery management operations and/or techniques, such as discussed above.

Figure 15:
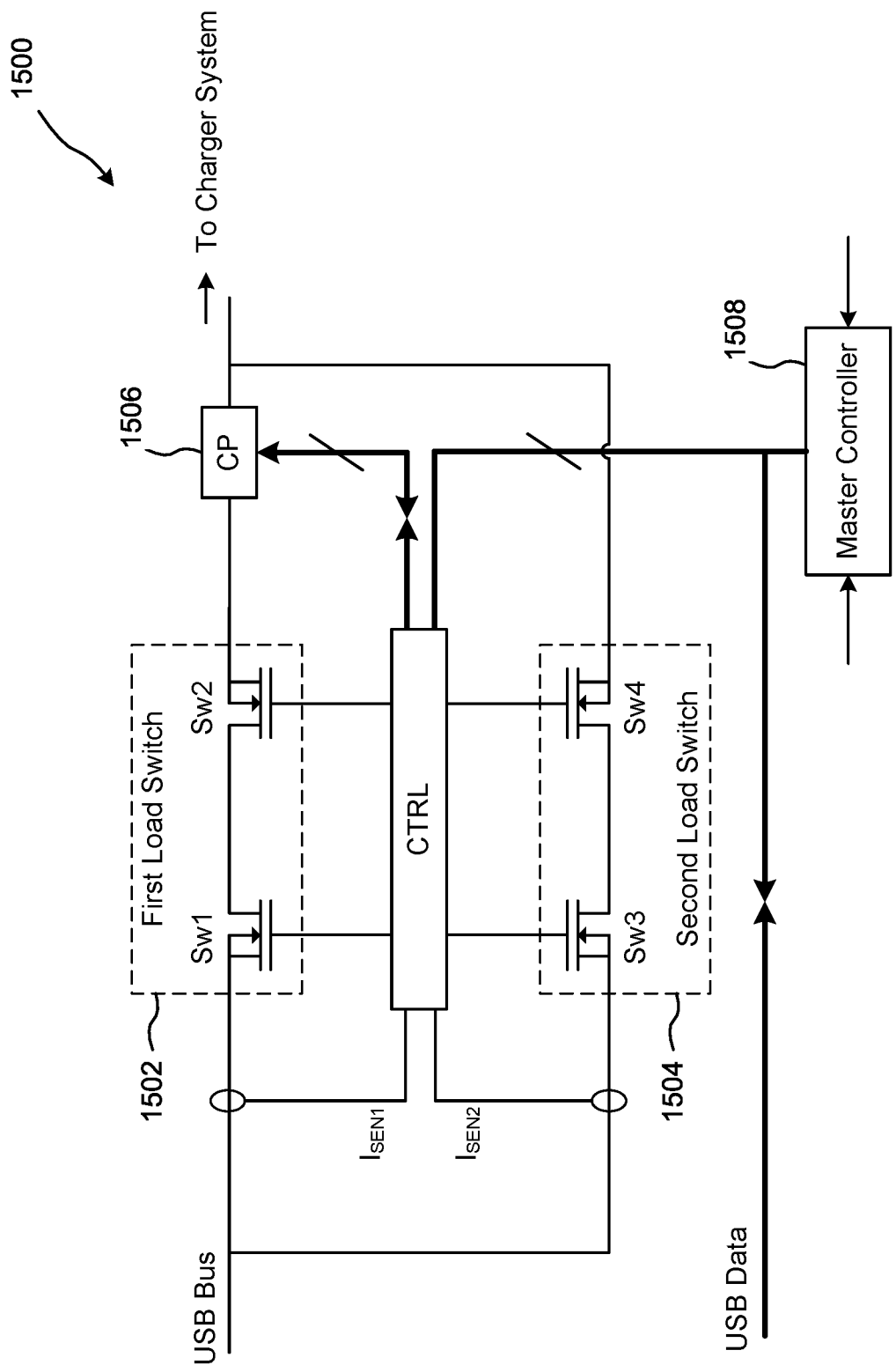
FIG. 15 is a schematic diagram illustrating an implementation of an example load switch.

FIG. 15 is a schematic diagram illustrating an example circuit topology 1500 that may, for example, be used, in whole or in part, to implement one or more load switches. Typically, a USB protocol may call for utilization of a load switch, which is the switch that breaks the voltage via opening a connector on a mobile device to disconnect the rest of the device (e.g., phone or laptop). In some instances, a load switch may be implemented as a bidirectional switch, for example, so that it may be capable of stopping power in the forward and/or reverse direction. A typical MOSFET may have a body diode in parallel with it. So, in order to prevent that body diode from conducting, it may be useful to put two switches connected in series with the body diode of the switches pointing at each other or away from each other (i.e., opposite directions). A control circuitry may set voltages to turn ON one or more load switches associated with circuit topology 1500, may sense the current $I_{SEN1}$, $I_{SEN2}$ going through a particular load switch (e.g., to detect overcurrent, etc.), or the like.

In an implementation, two load switches may be used. For example, as illustrated in FIG. 15, a first load switch 1502 comprising a first pair of series-connected MOSFET switches Sw1, Sw2 is directly coupled between a USB Bus and a charge pump CP, and a second load switch 1504 comprising a second pair of series-connected MOSFET switches Sw3, Sw4 is connected between the USB Bus and around CP 1506 to function as a bypass path. For legacy applications (e.g., older, lower voltage, etc.), there may be input voltages of 5V, 9V, 15V, or 20V, in which case the CP 1506 may be bypassed. In higher voltage applications, such as where input voltages of about 28V, 36V, or 48V may be present, then the CP 1506 may be utilized to lower the output voltage to a charger system.

As also discussed, a controller may communicate with various elements to facilitate and/or support proper battery charging (e.g., may sense the input voltage, determine what load switch should we turn on, etc.). For example, FIG. 15 shows a control circuit CTRL coupled to the gates of first load switch 1502 switch pairs Sw1, Sw2 and second load switch 1504 switch pairs Sw3, Sw4 and configured to sense the current on the USB bus line, $I_{SEN1}$ and $I_{SEN2}$ so as to be able to select a current path (through or around CP 1506) and open or close the switch pairs.

Further, because a particular load switch is placed before a charge pump, there may not be a need or use for a high-voltage disconnect switch in the charge pump, and the load switch may be used as a disconnect switch, if appropriate.

A load switch (e.g., load switches 1502, 1504) may also be capable of protecting one or more GaN devices that may be placed downstream. GaN devices may, for example, be built as normally-ON or normally-OFF devices, however, normally-OFF devices may typically be considered more superior than normally-ON devices. For example, utilization of normally-ON GaN devices may pose a safety issue. Thus, a load switch may be used to turn the power OFF, if needed, to protect GaN devices downstream. A load switch may be implemented with any suitable combination of one or more other protection circuits or elements (e.g., a disconnect switch, etc.), which may depend on a particular implementation. Also, a master controller 1508 may be capable of coordinating between a number of system or other elements so as to facilitate one or more suitable operations and/or processes, negotiate between a load switch, GaN devices, charge pumps, or the like. It should also be noted, in some implementations, a load switch may also be capable of controlling a slew rate of applicable voltage transitions (e.g., positive, negative), such as voltage transitions in a CP 1506.

Example System Embodiment

Figure 16:
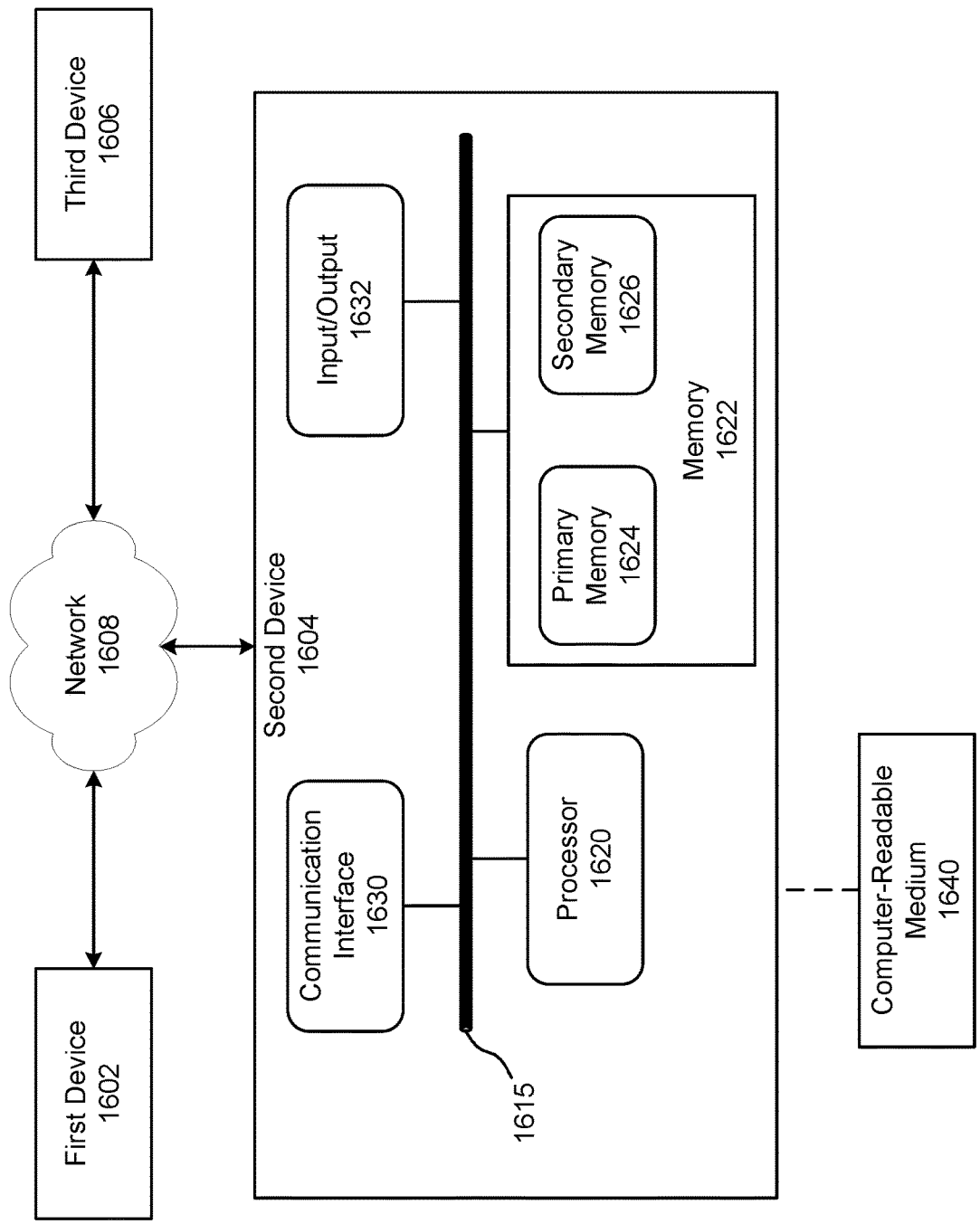
FIG. 16 is a diagram of a system embodiment may comprise a local network (e.g., second device and computer-readable medium) and/or another type of network, such as a computing and/or communications network.

In one example embodiment, as shown in FIG. 16, a system embodiment may comprise a local network (e.g., second device 1604 and computer-readable medium 1640) and/or another type of network, such as a computing and/or communications network. For purposes of illustration, therefore, FIG. 16 shows an embodiment 1600 of a system that may be employed to implement either type or both types of networks. Network 1608 may comprise one or more network connections, links, processes, services, applications, and/or resources to facilitate and/or support communications, such as an exchange of communication signals, for example, between, for example, a first computing device 1602 and a third computing device 1606, which may, for example, comprise one or more client computing devices and/or one or more server computing devices. By way of example, but not limitation, network 1608 may comprise wireless and/or wired communication links, telephone and/or telecommunications systems, Wi-Fi networks, Wi-MAX networks, the Internet, a local area network (LAN), a wide area network (WAN), or any combinations thereof.

Referring now to FIG. 16, in an embodiment, first and third devices 1602 and 1606 may be capable of rendering a graphical user interface (GUI) for a network device and/or a computing device, for example, so that a user-operator may engage in system use. Second device 1604 may potentially serve a similar function in this illustration. Likewise, in FIG. 16, first device 1602 may interface with second device 1604, which may, for example, also comprise features of a client computing device and/or a server computing device, in an embodiment. Processor (e.g., processing device) 1620 and memory 1622, which may comprise primary memory 1624 and secondary memory 1626, may communicate by way of a communication bus 1615, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Second device 1604, as depicted in FIG. 16, is merely one example, and claimed subject matter is not limited in scope to this particular example.

In FIG. 16, first device 1602 may provide one or more sources of executable computer instructions in the form physical states and/or signals (e.g., stored in memory states), for example. First device 1602 may communicate with second device 1604 by way of a network connection, such as via network 1608, for example. A connection, while physical, may not necessarily be tangible. Although second device 1604 of FIG. 16 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

In particular implementations, one or more of computing devices 1602, 1604 and/or 1606 may include one or more power converter circuits, such as one or more example circuits described herein. In particular implementations, two-stage power converter circuits, such as one or more example circuits described herein, may be utilized to provide power to any of a wide range of circuit types, processors, memory devices, communication interfaces, etc. Further, in particular implementations, one or more of computing devices 1602, 1604 and/or 1606 may include circuitry, processors, oscillators, etc., to control various functionalities and/or operations related to two-stage power converters.

Memory 1622 may comprise any non-transitory storage mechanism. Memory 1622 may comprise, for example, primary memory 1624 and secondary memory 1626, additional memory circuits, mechanisms, or combinations thereof may be used. Memory 1622 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1622 may be utilized to store a program of executable computer instructions. For example, processor 1620 may fetch executable instructions from memory and proceed to execute the fetched instructions. Memory 1622 may also comprise a memory controller for accessing the computer-readable medium 1640 that may carry and/or make accessible digital content, which may include code, and/or instructions, for example, executable by processor 1620 and/or some other device, such as a controller, as one example, capable of executing computer instructions, for example. Under direction of processor 1620, a non-transitory memory, such as memory cells storing physical states (e.g., memory states), comprising, for example, a program of executable computer instructions, may be executed by processor 1620 and able to generate signals to be communicated via a network, for example, as previously described. Generated signals may also be stored in memory, also previously suggested.

Memory 1622 may store electronic files and/or electronic documents, such as relating to one or more users, and may also comprise a computer-readable medium that may carry and/or make accessible content, including code and/or instructions, for example, executable by processor 1620 and/or some other device, such as a controller, as one example, capable of executing computer instructions, for example. The term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Referring again to FIG. 16, processor 1620 may comprise one or more circuits, such as digital circuits, to perform at least a portion of a computing procedure and/or process. By way of example, but not limitation, processor 1620 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1620 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 16 also illustrates second device 1604 as including an input/output component 1632 operable with input/output devices, for example, so that signals and/or states may be appropriately communicated between devices, such as second device 1604 and an input device and/or second device 1604 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

Words, Phrases, and Context

It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "subject matter" refer to subject matter intended to be covered by one or more implementations, or any portion thereof, and are not necessarily intended to refer to a complete implementation, to a particular combination of implementation, or to any portion thereof. It should also be noted that directions and/or references, for example, such as up, down, top, bottom, and so on, may be used to facilitate discussion of drawings and are not intended to restrict application of particular subject matter. Therefore, the following detailed description is not to be taken to limit subject matter and/or equivalents thereof.

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Nonlimiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. Likewise, the term "based on" and/or similar terms are understood as not necessarily intending to convey an exhaustive list of factors, but to allow for existence of additional factors not necessarily expressly described.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. Therefore, even if some or all of the dependent claims have been written with single dependency, it is to be understood that the present application provides full support for such claims to be multiply dependent on some or all of the other claims. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A battery management system for use with a power converter, the battery management system comprising:
   a first load switch configured to be coupled to a power delivery path;
   a first charge pump having a first terminal and a second terminal, wherein the first terminal is coupled to the first load switch and configured to selectively receive a first voltage through the first load switch from the power delivery path, and wherein the second terminal is configured to provide a second voltage different from the first voltage;
   a charging circuit comprising:
      a voltage terminal coupled to the second terminal of the first charge pump;
      a system voltage terminal;
      a charging voltage terminal configured to be coupled to a battery; and
      a second charge pump coupled to the charging voltage terminal and configured to receive the second voltage and provide a third voltage different from the second voltage to the system voltage terminal; and
      a charging transistor coupled between the system voltage terminal and the charging voltage terminal and configured to receive the third voltage and selectively charge the battery through the charging voltage terminal based on the third voltage.

2. The battery management system of claim 1, wherein the first load switch includes two MOSFET switches connected in series with body diodes pointed in opposite directions.

3. The battery management system of claim 1, further comprising a second load switch coupled in parallel with the first charge pump and configured to selectively bypass the first charge pump, wherein the second load switch includes two MOSFET switches connected in series with body diodes pointed in opposite directions.

4. The battery management system of claim 1, wherein the power delivery path is selectively couplable to either of a wired power delivery path or a wireless power delivery path, and wherein the second charge pump comprises:
   a first capacitor;
   a second capacitor;
   a first switch coupled between a first terminal of the first capacitor and a first terminal of the second capacitor;
   a second switch coupled between a second terminal of the first capacitor and a second terminal of the second capacitor;
   a third switch coupled to the first terminal of the second capacitor; and
   a fourth switch coupled between the second terminal of the second capacitor and a ground.

5. The battery management system of claim 1, wherein the second charge pump comprises:
   a capacitor;
   a first switch configured to selectively couple the voltage terminal to the capacitor; and
   a second switch configured to selectively couple the capacitor to the system voltage terminal and to the charging transistor.

6. The battery management system of claim 5, wherein the second charge pump further comprises:
   an inductor; and
   a third switch configured to selectively couple the capacitor to the inductor,
   wherein the second switch is coupled between the inductor and the system voltage terminal and configured to selectively couple the capacitor to the system voltage terminal and to the charging transistor through the third switch and the inductor when the third switch is turned on.

7. The battery management system of claim 6, wherein the second charge pump further comprises:
   a second capacitor, wherein the second switch is configured to selectively couple the second capacitor to the system voltage terminal; and
   a fourth switch configured to selectively couple the inductor to the second capacitor, wherein the second switch and the fourth switch are coupled between the inductor and the system voltage terminal.

8. The battery management system of claim 7, wherein the second charge pump further comprises a fifth switch configured to selectively couple the second capacitor to a ground.

9. The battery management system of claim 5, wherein the second charge pump further comprises:
   a third switch configured to selectively couple the capacitor to a ground; and
   a fourth switch configured to selectively couple the system voltage terminal to a ground.

10. A battery management system for use with a power converter, the battery management system comprising:
    a first charge pump having a first terminal configured to receive a first voltage, and a second terminal configured to provide a second voltage different from the first voltage;
    a first switch configured to be coupled between a wireless power delivery path and the first terminal of the first charge pump;
    a second switch configured to be coupled between a wired power delivery path and the first terminal of the first charge pump; and
    a charging circuit comprising:
       a voltage terminal coupled to the second terminal of the first charge pump;
       a system voltage terminal;
       a charging voltage terminal configured to be coupled to a battery; and
       a second charge pump coupled to the charging voltage terminal and configured to receive the second voltage and provide a third voltage different from the second voltage to the system voltage terminal; and
       a charging transistor coupled between the system voltage terminal and the charging voltage terminal and configured to receive the third voltage and selectively charge the battery through the charging voltage terminal based on the third voltage.

11. The battery management system of claim 10, wherein the first switch includes two MOSFET switches connected in series with body diodes pointed in opposite directions, and wherein the second switch includes two MOSFET switches connected in series with body diodes pointed in opposite directions.

12. The battery management system of claim 10, further comprising a third switch coupled between the second switch and the first terminal of the first charge pump and configured to selectively bypass the first charge pump.

13. The battery management system of claim 12, wherein the third switch includes two MOSFET switches connected in series with body diodes pointed in opposite directions.

14. A battery management system for use with a power converter, the battery management system comprising:

a first charge pump having a first terminal configured to receive a first voltage, and a second terminal configured to provide a second voltage different from the first voltage;

a set of switches coupled between a wireless power delivery path and the first terminal of the first charge pump, and between a wired power delivery path and the first terminal of the first charge pump, the set of switches configured to couple a selected one of the wireless power delivery path or the wired power delivery path to the first terminal of the first charge pump; and a charging circuit comprising:
- a voltage terminal coupled to the second terminal of the first charge pump;
- a system voltage terminal;
- a charging voltage terminal configured to be coupled to a battery; and
- a second charge pump coupled to the charging voltage terminal and configured to receive the second voltage and provide a third voltage different from the second voltage to the system voltage terminal; and
- a charging transistor coupled between the system voltage terminal and the charging voltage terminal and configured to receive the third voltage and selectively charge the battery through the charging voltage terminal based on the third voltage.

15. The battery management system of claim 14, wherein the first charge pump is a fully resonant charge pump and/or an adiabatic charge pump.

16. The battery management system of claim 14, wherein the first charge pump is a partially resonant charge pump and/or a partially adiabatic charge pump.

17. The battery management system of claim 14, wherein the first charge pump is a non-resonant charge pump.

18. The battery management system of claim 14, wherein the first charge pump is a diabatic charge pump.

19. The battery management system of claim 14, wherein the second charge pump is a fully resonant charge pump and/or an adiabatic charge pump.

20. The battery management system of claim 14, wherein the second charge pump is a partially resonant charge pump.

21. The battery management system of claim 14, wherein the second charge pump is a non-resonant charge pump.

* * * * *